Aug. 6, 1968   E. J. NUNLIST   3,396,085
WIPED FILM EVAPORATOR
Filed July 21, 1966
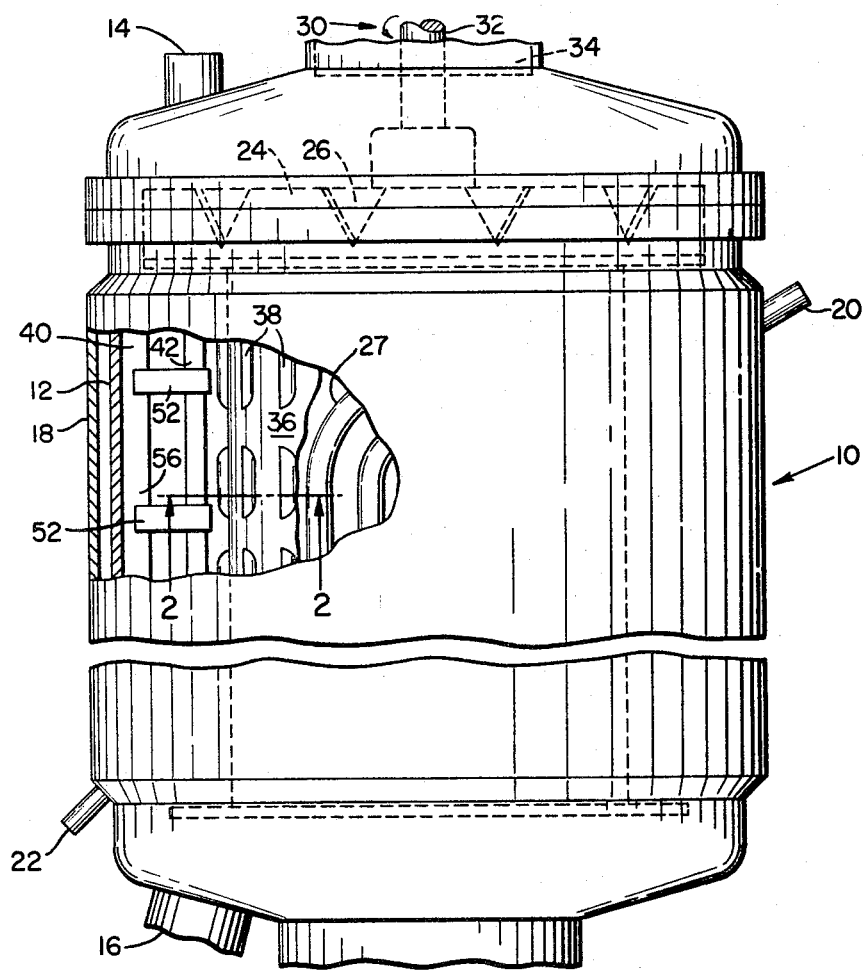
FIG. 1
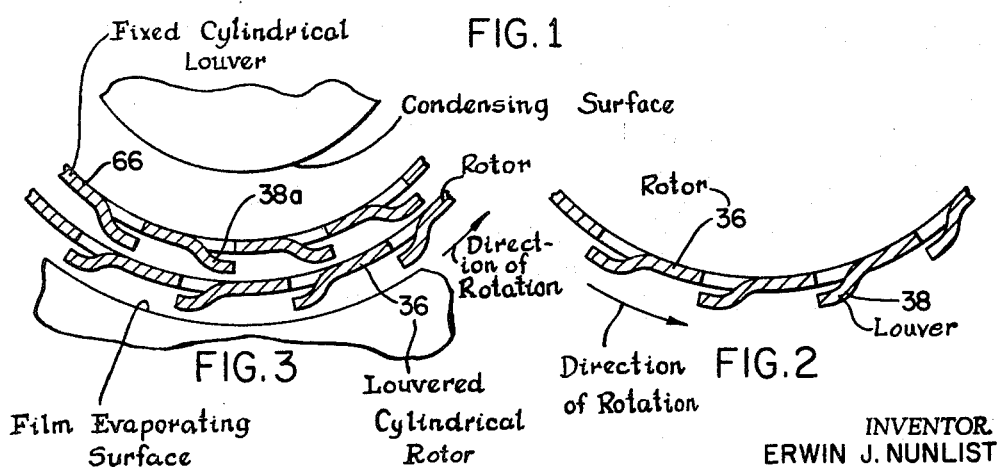
INVENTOR.
ERWIN J. NUNLIST

United States Patent Office 3,396,085
Patented Aug. 6, 1968

3,396,085
WIPED FILM EVAPORATOR
Erwin J. Nunlist, Penfield, N.Y., assignor to Ritter Pfaudler Corporation, Rochester, N.Y., a corporation of New York
Filed July 21, 1966, Ser. No. 566,978
2 Claims. (Cl. 202—187)

This invention relates generally to heat exchange apparatus. More particularly, the invention relates to an improvement in wiped film evaporators that facilitates separation of vaporized from non-vaporized materials therein.

Many industries utilize processes of evaporation in some phase of production. It is a well-known principle that heat transfer and evaporation rates tend to be inversely proportional to the thickness of a layer of fluid in contact with a heated surface. A wiped film evaporator is a type of evaporator in which a thin film is produced by first feeding fluid to a heated surface and then passing a wiper element, which may be a blade or some other suitable form, over the heated surface to wipe off excess fluid. When the wiper element is urged against the surface with sufficient force to reduce the fluid thickness, it is in a wiping relationship with the surface. A continuous wiping action can be accomplished by having wiper blades rotatably mounted and suspended within an upright heated cylindrical shell so that fluid introduced between the rotor and heated shell can flow down the interior of the shell. As fluid enters and runs down the interior of the heated shell, the rotor is turned causing the blades to rotate and advance fluid down the heated shell in a continuous wiping operation. The residue is then discharged from the bottom of the shell and the vapor, as condensate, leaves the vessel at an exit at the bottom.

As set forth hereinabove, a wiped film evaporator is generally constructed with a rotor suspended within a cylindrical shell. Separation takes place as volatile components escape from the thin film formed on the inner surface of the heated cylindrical shell. The volatile components then move from the shell to a condensing surface where they are condensed and exit.

In apparatus as described herein where continuous rotation of the wiper blades is utilized, a rotation is effected by a hollow rotor body suspended concentrically within the cylindrical shell and having the wiper blades mounted on the outer surface of said rotor body. Generally, condensing is effected by condensing means positioned within the void of the rotor body.

It is apparent that in such apparatus a path must be devised for the passage of the volatilized components, as vapor, from the heated surface through the rotor body to the condensing surface.

However, the operation of apparatus, such as described herein, involving a rotating wiper mechanism and a continuous feed of fluid to be treated tends to generate a certain amount of liquid splashing. This splashing in conjunction with the turbulence caused by the evaporation causes the formation of drops of liquid which will follow the path of the vapor to the condenser unless prevented. To prevent such passage of liquid, it is common to provide some type of entrainment separator that serves to screen out liquid drops but does not unduly hinder the flow of vapor to the condenser. It is the primary object of this invention to provide an improved entrainment separator.

Heretofore, various types of apparatus have been employed to prevent the undesirable passage of liquid. In evaporators wherein wiper blades are mounted in vertical slide channels that permit the blades to slide radially within the channel under the influence of centrifugal force, channels have been designed with laterally or radially disposed projections that serve to act as baffles and retard liquid travel. In addition, separate entrainment separators designed to prevent liquid from reaching the condenser have been interposed between the heated shell surface and the condensing surface. Such separators are designed to create a tortuous path that prevents movement of liquid but permits vapor to pass. Separators as described above have certain disadvantages. They are difficult to fabricate because of their complex shapes. They materially add weight to the wiper blade assembly when the separator is designed as a part of such an assembly or to the rotor when designed as a part of the rotor body. Further, such entrainment assemblies create cleaning problems that are directly proportional to the degree of their complexity. It is accordingly, a further object of this invention to provide wiped film evaporators wherein prevention of undesirable liquid passage is effected by a structure that is simple and economical to fabricate, is separate from the wiper assembly proper, minimizes areas where contaminants can accumulate and is easy to clean.

Another prior art device for preventing the passage of liquid from the evaporator shell to the condenser is the demister. Demisters are, in their most simplified forms, filters that entrap liquid but permit vapor passage. Although demisters are highly effective insofar as liquid removal is concerned, they cause a relatively large pressure drop which is disadvantageous in most operations and is particularly disadvantageous when the apparatus is operated as a molecular still. It is therefore yet another object of this invention to provide an entrainment separator that efficiently achieves separation of liquid from vapor yet does not cause an excessive pressure drop.

I have found that in a wiped film evaporator, of the stationary shell, rotating wiper element type, unwanted liquid passage is prevented by providing within the body of the rotor itself a plurality of integral louvers, opening in a direction opposed to the direction of rotation. Another embodiment of the invention additionally includes a stationary shell positioned concentrically within the void of the rotor and preferably mounted to the evaporator shell, said stationary shell having louvers with their openings facing in a direction opposite to those of the rotor body itself.

FIGURE 1 is a vertical view partly in section of apparatus according to my invention.

FIGURE 2 is a horizontal section taken along the line 2—2 of FIGURE 1.

FIGURE 3 is a view similar to FIGURE 2 of an embodiment of my invention wherein a stationary shell is also provided.

Referring now to the drawings, FIGURE 1 shows a wiped film evaporator generally designated at 10 comprising: a cylindrical evaporator shell 12, having a jacket 18 circumferentially spaced and substantially surrounding the shell; a rotor assembly generally designated at 30 and extending into the void of shell 12; and a wiper assembly generally designated at 40 connected to rotor assembly 30 and having elongated wiper blades 56 adapted to contact the inner surface of shell 12.

Still, in reference to FIGURE 1, but more specifically, jacket 18 surrounding shell 12 is provided with a fluid inlet 20 and a fluid outlet 22 through which fluid may be passed in contact with shell 12 to effect heat transfer through shell 12. A product inlet 14 and residue outlet 16 are also provided on shell 12. Within shell 12 and extending through the bottom thereof is a condenser 27.

A driving means (not shown) is mounted on top of shell 12 and drives rotor assembly 30 through a rotor shaft 32 which passes through a shaft seal 34. Rotor assembly 30 includes a cylindrical rotor body 36 having louvers 38 therein, said body being suspended axially within the void of shell 12. Fixed atop rotor body 36 is a distribution head 24 having weir openings 26 therein. Product which enters at product inlet 14 is received upon head 24 and proceeds to pass through weir openings 26 from whence it spills down the inner surface of shell 12.

Wiper assembly 40 comprises a plurality of circumferentially spaced torsion bars 42, a plurality of wiper blades 56, and flat springs 52 connected to said torsion bars 42 at one end and to said wiper blades 56 at the other end. Each torsion bar 42 is positioned generally parallel to the rotor axis. Carried at spaced intervals along torsion bars 42 are an aligned series of flat springs 52 extending laterally outward from torsion bars 42. Each spring 52 is adapted to clamp to torsion bar 42 and urge wiper blades 56 against the inner surface of shell 12.

FIGURE 2 is a detailed view showing louvers 38 formed integrally with rotor body 36 with the openings formed thereby opening in a direction opposite to the indicated direction of rotation.

FIGURE 3 is another embodiment of the present invention for use where maximum liquid separation is desired and pressure drop is of lesser importance. In this embodiment louvers 38 are provided in rotor body 36 in the same manner as shown in FIGURES 1 and 2. There is further provided a fixed cylindrical shell 66 having louvers 38a integral with the wall of shell 66 and with the openings formed thereby disposed in the direction of flow. Fixed shell 66 would be mounted to shell 12 by a flange or other suitable means.

It is apparent that liquid formed, either from splashing or turbulence, impinges upon the outside of louvers 38 and centrifugal force causes the liquid to be deflected to the surface of shell 12 where it is again subjected to the vaporizing influence of the shell or passes out as residue through outlet 16. Thus, the invention achieves its stated objects in providing an improved entrainment separator that is easily fabricated, relatively free of contamination sites and easily cleaned. Further, the invention does not cause excessive pressure drop nor add weight either to the rotor body or to the wiper assembly.

While the embodiments described and illustrated may be modified in various ways readily apparent to those skilled in the art, the invention is intended to include those within the spirit and scope of the following claims.

I claim:
1. Distillation apparatus comprising in combination:
    (a) a chamber having an internal surface of revolution upon which liquid is caused to flow, wiped to film thickness, and evaporated;
    (b) a condenser positioned within said chamber for condensing the vapor formed within said chamber;
    (c) a wiper assembly mounted upon a rotor body positioned within said chamber between the surface upon which vaporization occurs and the condenser; and
    (d) said rotor body having a multiplicity of louvers formed on the surface of said rotor body, said louvers opening in a direction opposite the direction of rotation;

whereby, during the operation of said apparatus, vapor formed on the internal surface of said chamber may pass through said louvers to said condenser and liquid formed within said chamber is deflected back toward said internal surface.

2. Apparatus according to claim 1, further comprising a stationary shell, affixed to said chamber and positioned within said chamber intermediate the louvered rotor and the condenser, said shell having a multiplicity of louvers formed on its surface, said louvers opening in a direction opposite to the louvers of said rotor body.

References Cited

UNITED STATES PATENTS

| | | | |
|---|---|---|---|
| 2,180,052 | 11/1939 | Hickman et al. | 202—236 X |
| 2,546,381 | 3/1951 | Zahm | 159—6 |
| 3,004,901 | 10/1961 | Nerge et al. | 159—6 X |
| 3,060,106 | 10/1962 | Keunecke et al. | 202—236 X |
| 3,274,076 | 9/1966 | Watt | 159—6 X |

NORMAN YUDKOFF, *Primary Examiner.*

J. SOFER, *Assistant Examiner.*